United States Patent [19]

Hobson

[11] Patent Number: 5,698,236

[45] Date of Patent: Dec. 16, 1997

[54] APPARATUS FOR IN MOLD TRIMMING

[76] Inventor: Gerald R. Hobson, 21721 Walnut St., Shell Rock, Iowa 50670

[21] Appl. No.: 607,180

[22] Filed: Feb. 26, 1996

[51] Int. Cl.[6] .................................................. B29C 39/30
[52] U.S. Cl. ..................... 425/301; 425/527; 425/531; 264/161; 264/536
[58] Field of Search ........................... 425/531, 527, 425/806, 534, 537, 525, 536, 301; 264/536, 161

[56] References Cited

U.S. PATENT DOCUMENTS

| Re. 30,215 | 2/1980 | Kuenzig et al. | 425/525 |
|---|---|---|---|
| 3,362,043 | 1/1968 | Langdon et al. | 425/531 |
| 3,752,629 | 8/1973 | Gordon | 425/806 |
| 4,368,027 | 1/1983 | Lorgi et al. | 425/527 |
| 4,696,636 | 9/1987 | Evely | 425/526 |
| 4,966,543 | 10/1990 | Krishnakumav et al. | 425/522 |
| 5,480,607 | 1/1996 | Hobson . | |

*Primary Examiner*—Jay H. Woo
*Assistant Examiner*—Iurie A. Schwartz
*Attorney, Agent, or Firm*—Henderson & Sturm

[57] ABSTRACT

An apparatus for trimming blow-molded products while in the mold including the steps of placing a parson between a mold having two mold halves, moving the two mold halves to form a cavity and close a portion of the parison, pressurizing the inside of the parison to produce a product and trimming a portion of the product while it is in the mold by moving a cutter across the cavity and across the portion of the product to be cut. The mold halves are then separated and the product is removed therefrom.

8 Claims, 3 Drawing Sheets

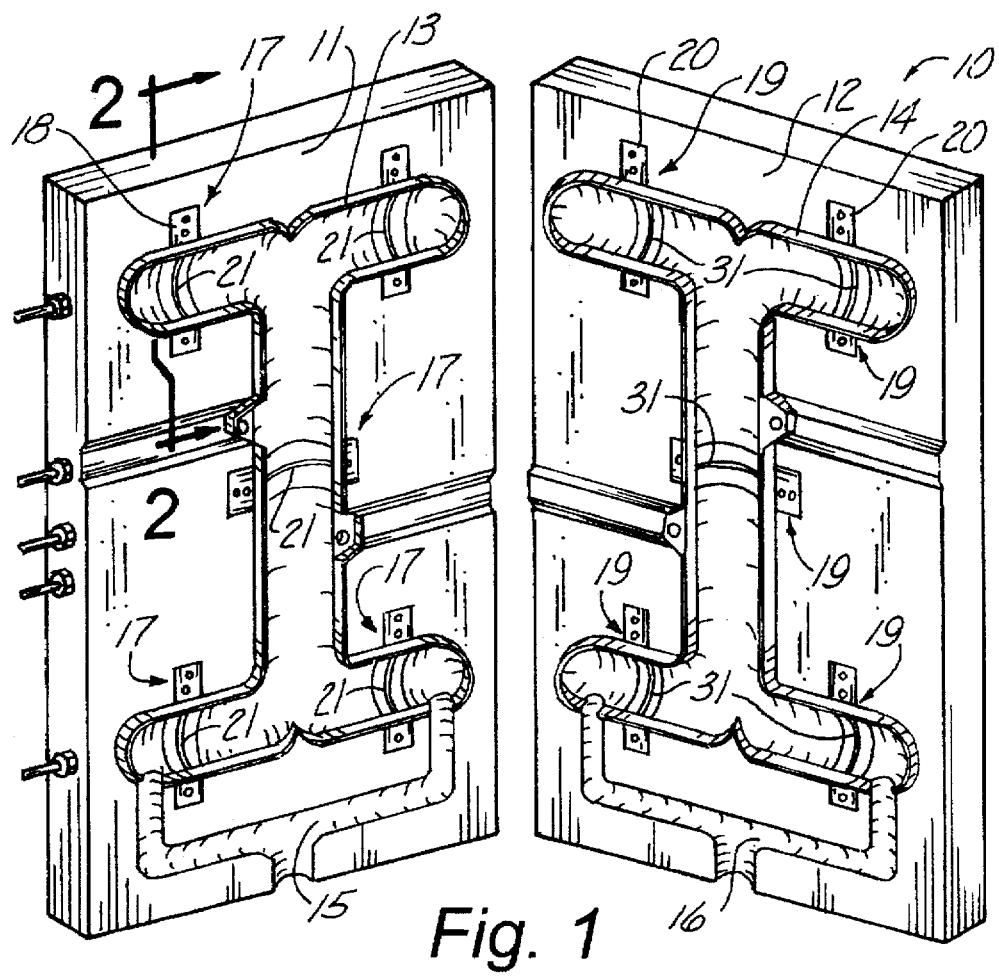
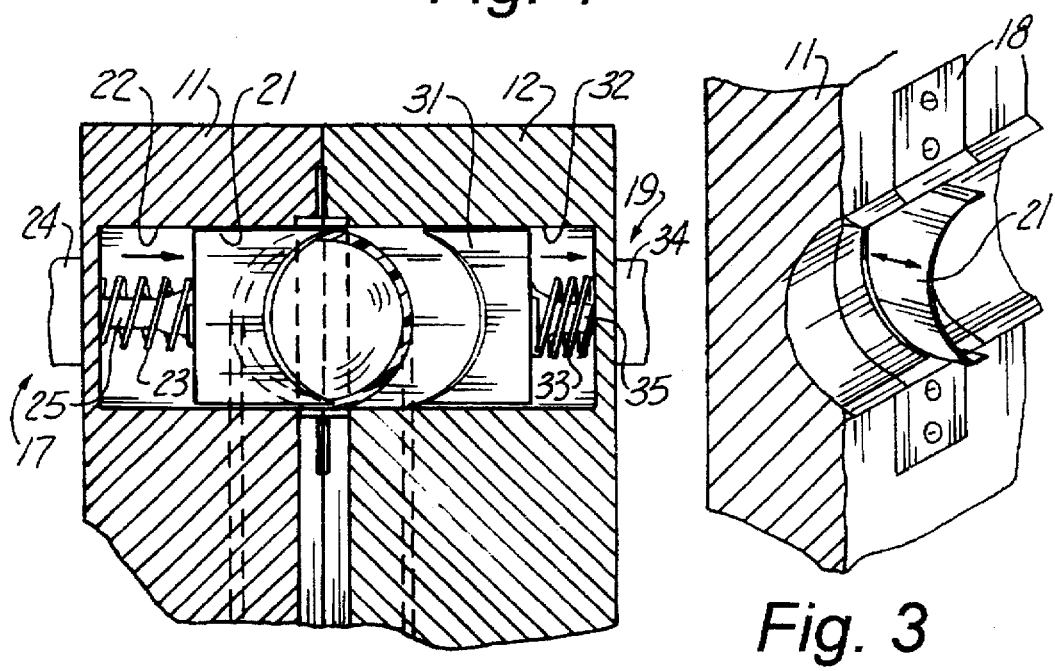

APPARATUS FOR IN MOLD TRIMMING

BACKGROUND OF THE INVENTION

1. Technical Field

The present invention relates generally to a method and apparatus for trimming blow-molded parts and more particularly to such a method and apparatus where the trimming is achieved inside the mold to reduce and/or eliminate secondary trimming.

2. Description of the Prior Art

Most blow molded products need to be trimmed after they are ejected from the mold. In some products, this trimming relates not only to the flash but also to other areas in a molded part. There is consequently a need to be able to reduce and/or eliminate as much of the trimming as possible. Such a reduction in the labor involved in trimming will also reduce injuries to workers, and will reduce the cost of secondary equipment.

SUMMARY OF THE INVENTION

The present invention relates to a method of trimming blow-molded products while in the mold including the steps of placing a parson between a mold having two mold halves, moving the two mold halves together to form a cavity and enclose a portion of the parison, pressurizing the inside of the parison to produce a product and trimming a portion of the product while it is in the mold by moving a cutter across the cavity and across the portion of the product to be cut. The mold halves are then separated and the product is removed therefrom.

The apparatus for achieving this method includes a cutter slidably disposed in a first slot and having a slot plugging member slidably exposed in a second slot wherein the cutter and slot plugging member will prevent plastic from entering the first and second slots when the plastic product is being formed. After the plastic is being formed, the cutter and slot plugging member can be actuated to cut through the product at the desired location.

An object of the present invention is to provide an improved method and apparatus for trimming blow-molded parts.

Another object of the present invention is to provide a method and apparatus for trimming blow-molded parts while the parts are still in the mold.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of two mold halves showing the in mold trimming apparatus in a preferred embodiment thereof, FIG. 2 is an enlarged cross-sectional view taken along line 2—2 of FIG. 1 and showing a cutting blade and one mold half and a slot plugging member in the other mold half, each being biased to a position to prevent plastic from creeping into the respective slots of the cutter and plug slot plugging member;

FIG. 3 is an enlarged perspective view of one of the cutters shown in an extended cutting position;

DESCRIPTION OF THE PREFERRED EMBODIMENT(S)

Figure 8:
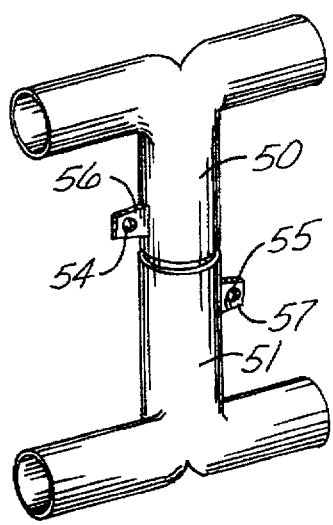
FIG. 8 shows the ultimate product being formed in pairs by use of the method and apparatus of FIGS. 1–7.

Referring now to the drawings Wherein like reference numerals designate identical or corresponding parts throughout the several views, FIG. 1 shows a molding and in mold trimming apparatus (10) constructed in accordance with the present invention. Mold halves (11 and 12) have cavity portions (13 and 14) connected thereto. Channels (15 and 16) form a passage way for air under pressure to pressurize the inside of a parison used to produce the product shown in FIG. 8.

Figure 4:
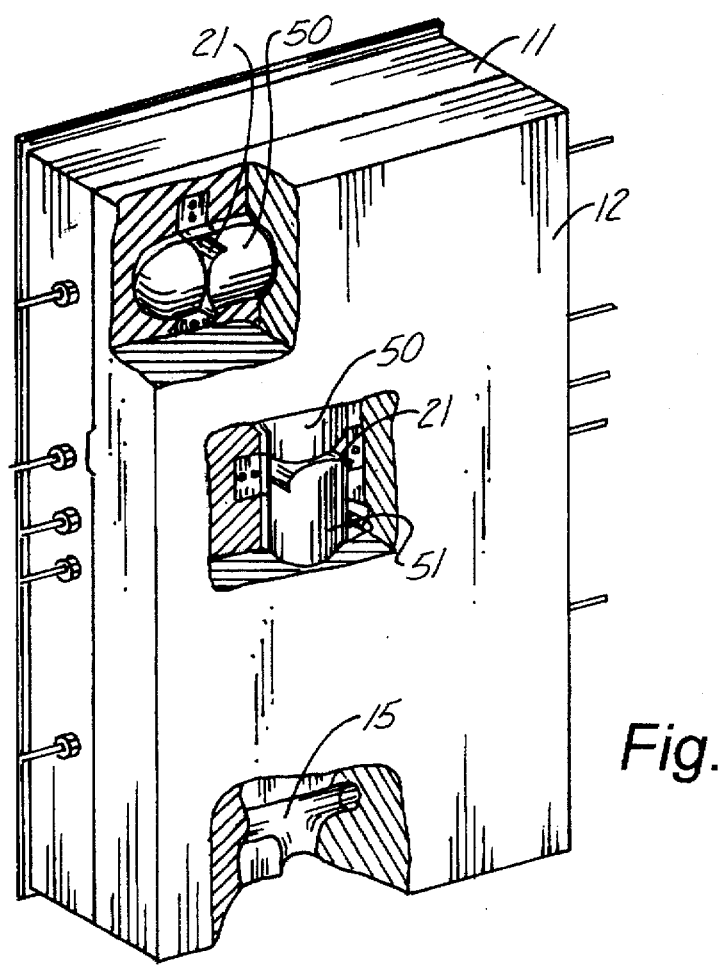
FIG. 4 is a perspective view of the present invention with the two mold halves together with a parison having been used to blow-mold a product and showing broken away sections of two of the cutters cutting the product and another cut-away section showing the air passage way leading to the inside of the parison and mold cavity.
Figures 5, 6:
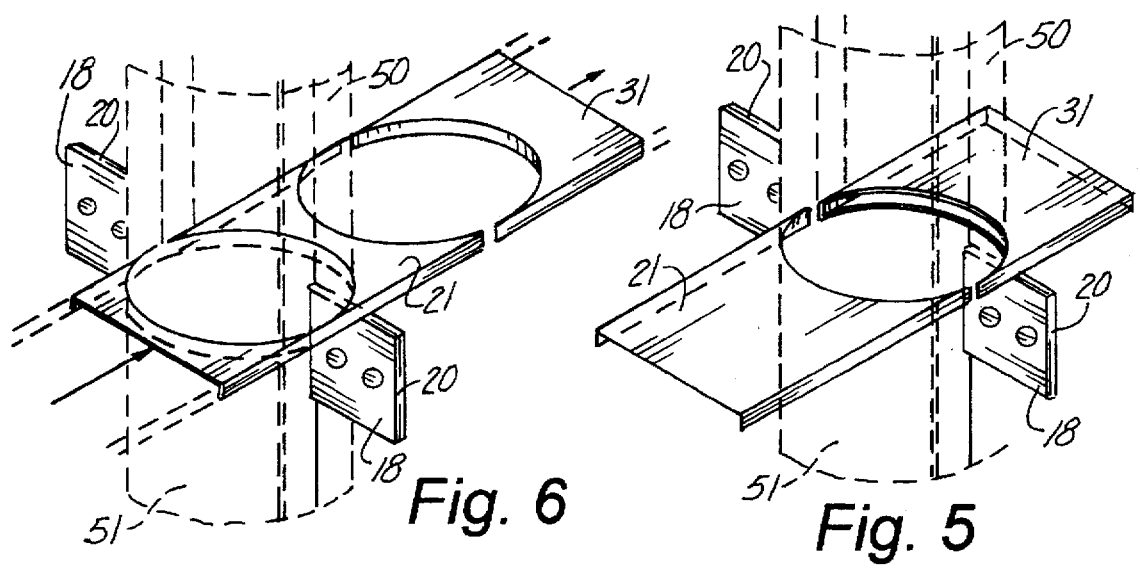
FIG. 6 is an enlarged perspective view of the cutter and slot plugging member of FIGS. 2 and 3 shown in a position of having already cut through the product in the center section thereof as shown in FIG. 4.
FIG. 5 is a view of the cutter and slot plugging member in the position to which it is biased to block flow of plastic out of the slots in which the cutter and slot plugging member reciprocate.

FIG. 2 shows a cutter assembly (17) associated with and connected to the half (11) by flange members (18). A slot blocking apparatus (19) is shown attached to the mold half(12) in FIG. 2 and is held in place by flanges (20). The cutter (21) slides in a slot (22) in mold half(11) and is biased to the position shown in dashed lines in FIG. 2, and shown right at the surface of the mold in FIG. 1, to block plastic from entering the slot (22) during the molding process. A spring (23) biases the cutter (21) to the slot blocking position shown in FIG. 1. It is operable to move the cutter (21) from the slot blocking position shown in FIGS. 1 and 5 to the cutting position shown in FIGS. 3, 4 and 6.

Similarly the slot (32) has slot blocking member (31) slidably disposed therein with a biasing spring (33) to bias the slot blocking member (31) to the position shown in FIG. 1 wherein plastic will not be allowed to enter the slot (32) during the molding process and an actuator (34) is utilized to move the slot blocking member (31) through a post (35). The actuators (24 and 34) can be mechanical, pneumatic, or electro-mechanical devices. Also, it is possible to merely use one actuator (24) and eliminate actuator (34) by allowing the blade (21) to push the slot blocking member (31) out of the way when the blade (21) is activated to the second position shown in FIGS. 3, 4 and 6. It is noted that while the blade (21) is flat throughout most of its length, the ends thereof are turned at 90° to help in stabilizing the blade (21) and making it more rigid without adding bulk.

Figure 7:
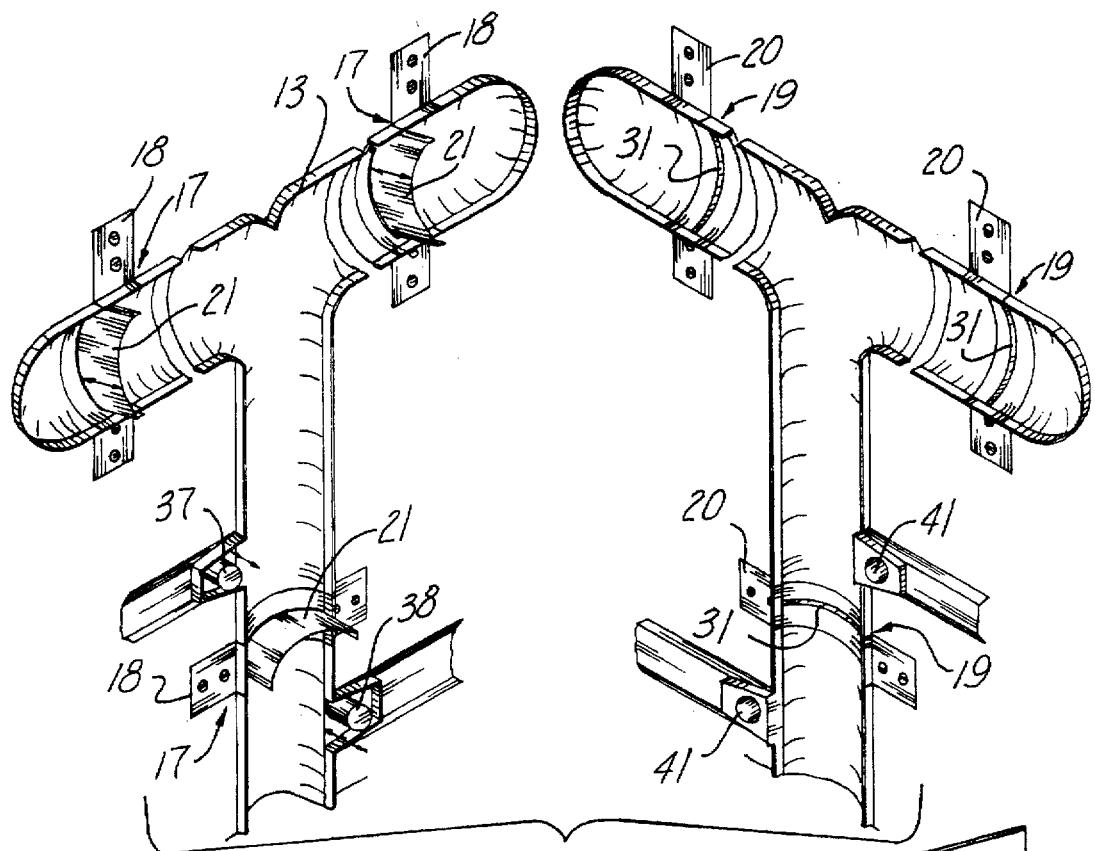
FIG. 7 is a perspective view of the cavity forming portions of the two mold halves and showing three of the six cutters which have been actuated and showing the two punches also actuated at the same time as the cutters.

Referring to FIG. 7, the cavity forming member (13) also has a punch (37 and 38) which are actuated in a manner identical to the actuators of the cutter shown in FIG. 2 and extend or punch simultaneously with the actuation of the cutters (17) which are all actuated simultaneously as are all of the slot blocking members (19) and punch hold blocking members (41), which are not shown in detail but operate in the same way as slot blocking members (31) shown in FIG. 2.

In operation, the mold halves (11 and 12) are positioned in the position shown in U.S. Pat. No. 5,480,607 to Hobson, which is incorporated herein by reference. This shows the standard way in which a blow-molding occurs, wherein the parison comes down between the two mold halves which are spaced apart, the mold halves then are pushed together, squeezing the parison around the mold cavity (13 and 14), at which time air under pressure is introduced through channels (15 and 16) to cause the parison to conform to the interior of the mold cavities (13 and 14).

Figure 9:
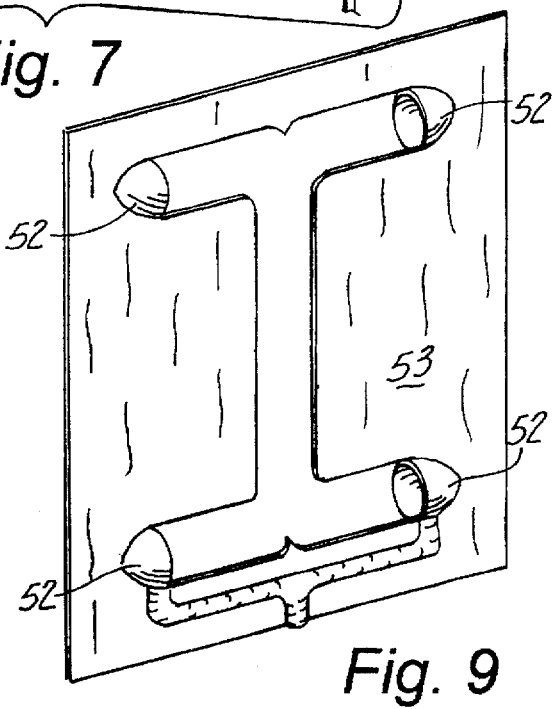
FIG. 9 shows the trimmed off flash portion of the parison, which can be recycled.

The trimming on the outside of the cavity, which is shown in FIG. 9, can be accomplished in the manner shown in the aforementioned Hobson patent, or in other ways if desired.

The five cutters (21) shown in FIG. 1 are used after the part is blow-molded in a conventional fashion. The knives (21) are actuated to the position shown in FIGS. 3, 4, 6 and 7 to cut the molded part (50 and 51) apart and cut the ends (52) off, which ends (52) stay connected to the flash (53) which is separated, for example, in the manner shown in the aforementioned Hobson patent. At the same time that the knives (21) are actuated, the punches (37) punch holes (54 and 55) through flanges (56 and 57) on parts (50 and 51). Then the press opens the two mold halves (11 and 12) and the parts are ejected in a conventional fashion. The next molding cycle can then begin.

Accordingly, it will be appreciated that some of the features that can be trimmed in the mold are blow domes, transition between parts, neck openings, etc. It will also be appreciated that the preferred embodiment of the apparatus and method shown and disclosed does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. An apparatus for trimming molded plastic products while still in the mold, said apparatus comprising:

a first mold half having a first cavity and a first slot disposed in the first mold half;

a second mold half having a second cavity for mating with the first cavity and a second slot disposed in the second mold half;

a cutter slidably disposed in a first slot in the first mold half and having a first position and a second position, one end of the cutter conforming generally to a shape of an interior wall of the first cavity in the first position thereof whereby a plastic will be prevented from flowing into the first slot;

a slot blocking member slidably disposed in a second slot in the second mold half and having a first position and a second position, one end of the slot blocking member being disposed in the second slot in the first position thereof and substantially conforming to a shape of an interior wall of the second cavity in said first position thereof whereby plastic will substantially be prevented from flowing into the second slot;

a first mechanism for biasing the cutter to the first position thereof, a second mechanism for biasing the slot blocking member to the first position thereof, and a third mechanism for moving the cutter to the second position thereof and causing the slot blocking member to move in the second slot to the second position of the slot blocking member.

2. The apparatus of claim 1 wherein the third mechanism for moving the cutter is pneumatic.

3. The apparatus of claim 1 wherein the third mechanism for moving the cutter is mechanical.

4. The apparatus of claim 1 wherein the third mechanism for moving the cutter is electro-mechanical.

5. The apparatus of claim 1 wherein the first mechanism for biasing comprises a spring.

6. The apparatus of claim 5 wherein the second mechanism for biasing comprises a spring.

7. The apparatus of claim 1 wherein the first mechanism for biasing comprises a helical spring.

8. The apparatus of claim 7 wherein the second mechanism for biasing comprises a helical spring.

* * * * *